May 19, 1931.  H. G. R. NAUMANN  1,806,490
ROTARY COOLING DRUM
Filed Feb. 21, 1929

INVENTOR
H. G. R. Naumann
BY
ATTYS.

Patented May 19, 1931

1,806,490

UNITED STATES PATENT OFFICE

HERMANN GUSTAV ROBERT NAUMANN, OF NIJMEGEN, NETHERLANDS

ROTARY COOLING DRUM

Application filed February 21, 1929, Serial No. 341,816, and in the Netherlands November 6, 1928.

The present invention relates to a method and a device for cooling fatty substances in liquid condition, such as fats, fat emulsions and like substances, by spreading the same in a thin layer or film over a cooling surface.

It has already been proposed to cool fats in liquid condition or fat emulsions by spreading the same in a thin layer of adjustable thickness by means of a rotary substance deliverer over the outer or inner side of a stationary vertical cooling drum and which has chambers for a cooling liquid the evaporation of which produces the cooling of the drum whereupon the cooling mass is scraped off from the drum of its circumference by means of a rotary scraping-knife extending over the full width of the drum.

It has also been known to cool a rotating cylinder for congealing ice cream to a sufficiently low temperature by the expansion of compressed carbonic acid or other suitable gas in its interior; in this apparatus the cylinder is connected with a reservoir containing carbonic acid in a highly compressed or liquefied state by a stop valve and a reducing valve by which the pressure of the gas may be reduced to any desired point before it enters the freezing apparatus. Further it has been suggested to pass liquid freezing mixture of ammonia through a stationary coil within a rotating drum on to which ice cream is fed for freezing the same.

In these and similar devices the cooling is obtained by the circulation of a cooled liquid, preferably a salt solution, along the inner side of the cooling surface.

The invention consists in this that the cooling of the surface, over which the mass to be cooled is spread is effected by direct evaporation of a normally gaseous cooling means, however liquefied by compression or otherwise (e. g. ammonia), which is caused to flow along the cooling surface.

By reason of the absorption of heat from the mass to be cooled the cooling liquid is is evaporated, whereby a very intensive cooling is obtained.

It has appeared that by carrying out the method according to the invention highly satisfactory results are obtained.

In the first place the means, which up to now are required in these cooling-devices for cooling and conveying the necessary brine may be omitted and consequently the considerable drawbacks and cooling-losses, to which they gave rise, are avoided.

In practice it is perhaps still more important that moreover the capacity of the cooling device is almost doubled by reason of the fact that by the evaporation of the cooling liquid the heat is much more rapidly absorbed from the mass to be cooled than by brine cooling.

In cooling-drums in which the method according to the invention will be carried out, the chamber in which the cooling-means circulates and is evaporated, may be formed by the wall of the cooling-drum and a concentric cylindrical surface having a smaller radius and disposed within the cooling-drum. The walls of the evaporating chamber may be provided with ribs, corrugations, projections and the like in such a manner that the path to be traversed by the cooling means is lengthened and the surface, contracting with the cooling means, is increased.

According to the invention the inner and outer cylinder are preferably interconnected by partitions so as to form one heat conducting unit, in such a manner that the inner cylinder as well as the outer cylinder and the partitions constitute a single, unitary operative cooling-surface, whereby the heat supplied from the outer side of the outer cylinder is transmitted to the cooling means. The outer cylinder, the partitions and the inner cylinder may for instance form one single casting.

The invention will be more fully understood with reference to the accompany drawings illustrating it by way of example.

In the embodiment schematically shown the cooling drum comprises an outer cylinder, partitions and an inner cylinder forming together one single piece.

Figure 1:
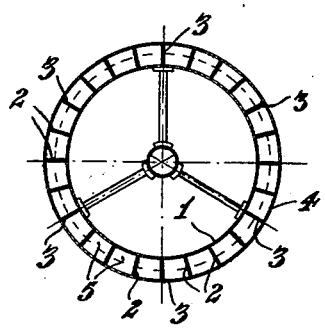
Fig. 1 is a cross section of the cooling-drum.
Figure 2:
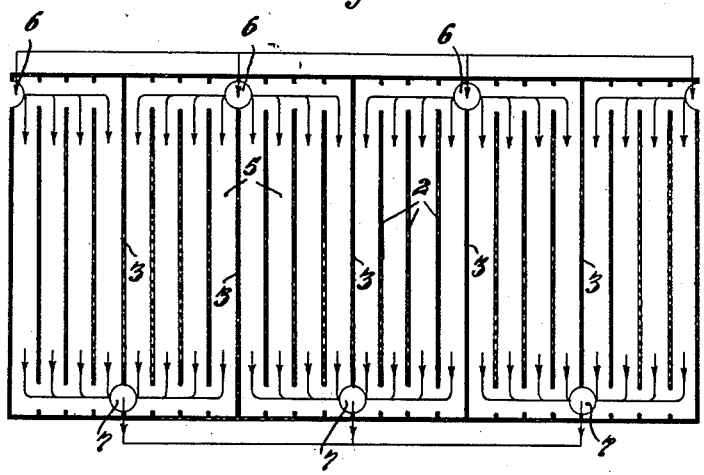
Fig. 2 is a development of the drum according to the dotted line indicated in Fig. 1.

The cooling-drum shown is provided with a double wall and comprises an inner cylinder 1 connected by means of longitudinal ribs 2, 3 to an outer cylinder 4. The whole consists of one single casting. The ribs 2, 3 form longitudinal passages 5 uniformly distributed circumferentially of the drum. The longitudinal passages are divided by the ribs in groups or sections, having at one end, at 6, the inlet for the normally gaseous but liquefied cooling means and at the other end, at 7, the outlet for the evaporated cooling medium.

It is of great importance that in the device for supplying the cooling liquid to the cooling drum as well as in the device for the discharge of the evaporated cooling means leaks cannot be formed.

I claim:—

1. Method for cooling fatty substances in liquid condition comprising the steps that the liquid fats are spread in a thin layer in a substantially liquefied state over a cooling surface, that a normally gaseous but liquefied cooling means is passed along the inner side of the cooling-surface.

2. Method for cooling fatty substances in liquid condition comprising the steps that the liquid fats are spread in a thin layer in a substantially liquid state over the cooling-surface of a cooling drum, that a normally gaseous but liquefied cooling means is passed along the inner side of the cooling surface, and that the cooling is created directly by means of the evaporation of a considerable part of the said liquid cooling means.

3. Method for cooling fatty substances in liquid condition comprising the steps that the liquid fats are spread in a thin layer in a substantially liquid state over the cooling surface of a cooling drum, that a normally gaseous cooling means liquefied by compression is passed along the inner side of the cooling surface, and that the cooling is created directly by means of the evaporation of a considerable part of the said liquid cooling means.

4. A cooling device for cooling fatty substances which are in liquid condition, comprising a cooling drum, the inner side of which forms the operative portion of the walls bounding the space in which the cooling means circulates, and over the outer side of which the liquids to be cooled are distributed; a second drum arranged interiorly of and substantially concentrically with the said first-mentioned drum; substantially linear partitions extending substantially longitudinally of the said drums, and extending substantially radially therebetween and interconnecting the same to form a single heat conducting unit; means for feeding the cooling means in liquid condition to the cooling chamber thus produced; and means for discharging the evaporated cooling means.

5. A rotating cooling drum for cooling fatty substances by means of an evaporating liquid refrigerant, consisting of an outer and inner cylinder enclosing an annular chamber for the circulation and the evaporation of the liquid refrigerant, and an inlet to an outlet from the said chamber respectively for the liquid refrigerant and for the refrigerant evaporated in the chamber.

In testimony whereof I affix my signature.

HERMANN GUSTAV ROBERT NAUMANN.